United States Patent [19]

Kowal

[11] 4,164,758
[45] Aug. 14, 1979

[54] NOISE SUPPRESSION APPARATUS

[76] Inventor: Leonard Kowal, 12647 Miller Ave., Saratoga, Calif. 95070

[21] Appl. No.: 829,186

[22] Filed: Aug. 30, 1977

[51] Int. Cl.² .................... H04N 5/21; H04B 1/10; H04B 15/00
[52] U.S. Cl. .................... 358/167; 325/52; 325/65; 325/313; 325/371; 325/473
[58] Field of Search ............ 358/166, 167; 325/52, 325/65, 313, 371, 473, 480, 482; 328/165

[56] References Cited

U.S. PATENT DOCUMENTS

| | | | |
|---|---|---|---|
| 3,605,018 | 9/1971 | Coviello | 325/473 |
| 3,800,077 | 3/1974 | Smith | 358/166 |
| 3,821,482 | 6/1974 | Hirsch | 325/473 |
| 3,975,586 | 8/1976 | Chow et al. | 358/166 |
| 4,015,076 | 3/1977 | Ishiodori | 358/167 |

Primary Examiner—Richard Murray
Attorney, Agent, or Firm—Thomas E. Schatzel

[57] ABSTRACT

An improved noise suppression apparatus for reducing noise contamination of a video enhancement signal including a first circuit for developing a first signal proportional to the absolute value of the enhancement signal, a peak clipper for limiting the excursion of the first signal to a predetermined level and a multiplier responsive to the enhancement signal and the clipped first signal for developing a noise reduced video enhancing signal.

9 Claims, 4 Drawing Figures

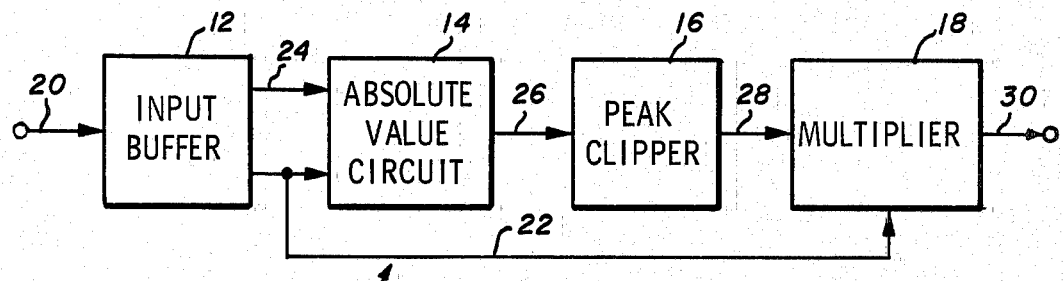
Fig_1
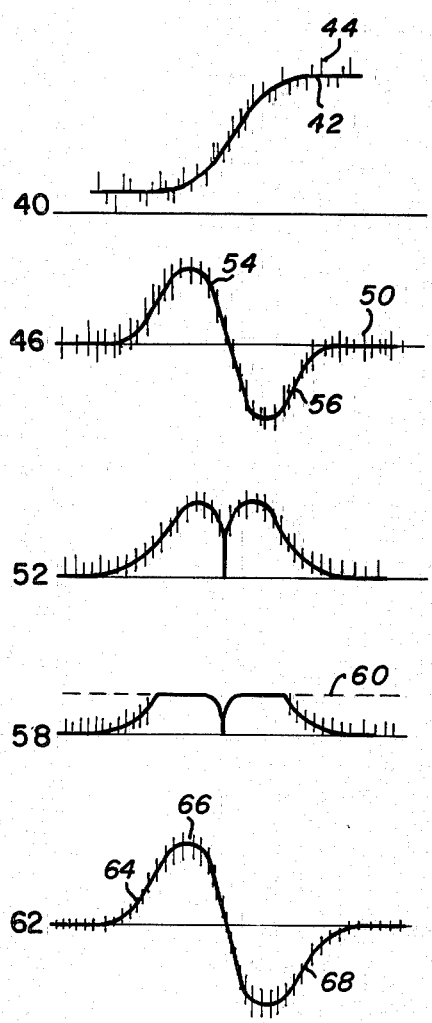
Fig_2
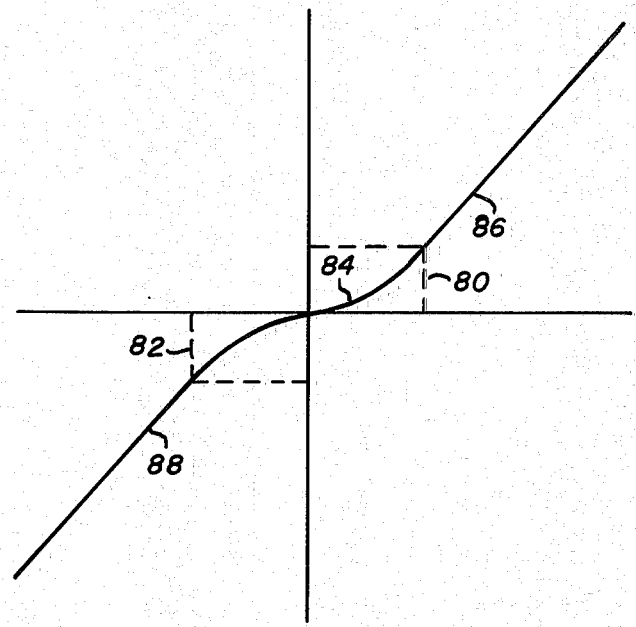
Fig_3

NOISE SUPPRESSION APPARATUS

BACKGROUND OF THE INVENTION

1. Field of the Invention

The present invention relates generally to video signal enhancement apparatus and more particularly, to noise clippers for reducing the noise contamination of a video enhancement signal.

2. Description of the Prior Art

Because of bandwidth limitations in video equipment, signals representing abrupt transitions in the luminosity of images are not faithfully reproduced. Images created from these bandwidth limited signal manifest a resultant lack of detail. To compensate for such loss of detail, video enhancement circuits are used which combine the video signal with the inverse of the second derivative of that signal. The resultant signal exhibits an exaggerated, or peaked, transition.

One circuit for developing a signal proportional to the second derivative of a video signal includes two series connected, but isolated, RC circuits. A more sophisticated approach for developing a second derivative signal includes two series-connected delay lines for developing a first delayed video signal and a second, further delayed video signal. Next, the video signal is subtracted from the first delayed signal in a first differential amplifier, and the second delayed signal is subtracted from the delayed signal in a second differential amplifier. Finally, the signals from the two differential amplifiers are combined to produce a second derivative, or video enhancing, signal. This signal is also called a detail signal.

A major problem with video enhancers is that the differentiating process is quite susceptible to noise contamination. A noise pulse from the video signal would appear as a transition to the differentiation apparatus which produces a pair of complementary output pulses, or doublet, for each noise pulse present on the video signal.

A prior art device for removing, or "coring," the noise from the enhancement signal includes three series-connected biasing resistors connected between a first and second power supply potential. A first AC coupling capacitor couples the enhancement signal to the anode of a first diode having a cathode which is connected both to the juncture of the first and second biasing resistors and, by a second AC coupling capacitor, to an output terminal. The first AC coupling capacitor also couples the enhancement signal to the cathode of a second diode having an anode which is connected both to the juncture of the second and third biasing resistors and, by a third AC coupling capacitor, to the output terminal.

The biasing resistors develop potentials sufficient to reverse bias the diodes, preventing their conduction, except for enhancement signals having positive and negative excursions exceeding the biasing potential by the diode voltage drop. This circuit removes or "cores" the center noise-carrying portion of the enhancement signal. Although effective in reducing the noise contamination, coring techniques also eliminate low level enhancement signals, reducing the effectiveness of the enhancement process.

SUMMARY OF THE INVENTION

It is therefore a primary object of the present invention to provide a noise clipping apparatus for reducing noise contamination of a video enhancement signal which does not eliminate low level enhancement signal.

Briefly, the preferred embodiment of the present invention includes a buffer circuit responsive to a video enhancement signal and operative to develop a buffered enhancement signal and its complement, a circuit responsive to the buffered enhancement signal and its complement and operative to develop a first signal representing the absolute value of the enhancement signal, a peak clipper responsive to the first signal and operative to develop a clipped signal having an amplitude substantially that of the first signal for signal levels less than a preset value and having an amplitude substantially that of the preset value for first signal levels in excess of the preset value, and a multiplier responsive to the clipped signal and the buffered video enhancement signal and operative to generate a video enhancement signal having reduced noise contamination.

An important advantage of the present invention is the ability to reduce the noise contamination of low level video enhancement signals which would otherwise be unusable.

The advantageous manner in which the present invention reduces the noise associates with video enhancement signals without eliminating lower level enhancement signal will no doubt become apparent to those of ordinary skill in the art after having read the following detailed description of the preferred embodiment illustrated in the several figures of the drawing.

IN THE DRAWING

FIG. 1 is a block diagram generally illustrating the principal subcircuits of an improved noise suppression apparatus in accordance with the present invention;

FIG. 2 illustrates waveforms associated with the various subcircuits of the noise suppression apparatus as illustrated in FIG. 1;

FIG. 3 illustrates the transfer characteristics of the noise suppression apparatus as illustrated in FIG. 1.

DETAILED DESCRIPTION OF THE PREFERRED EMBODIMENT

Figure 4:
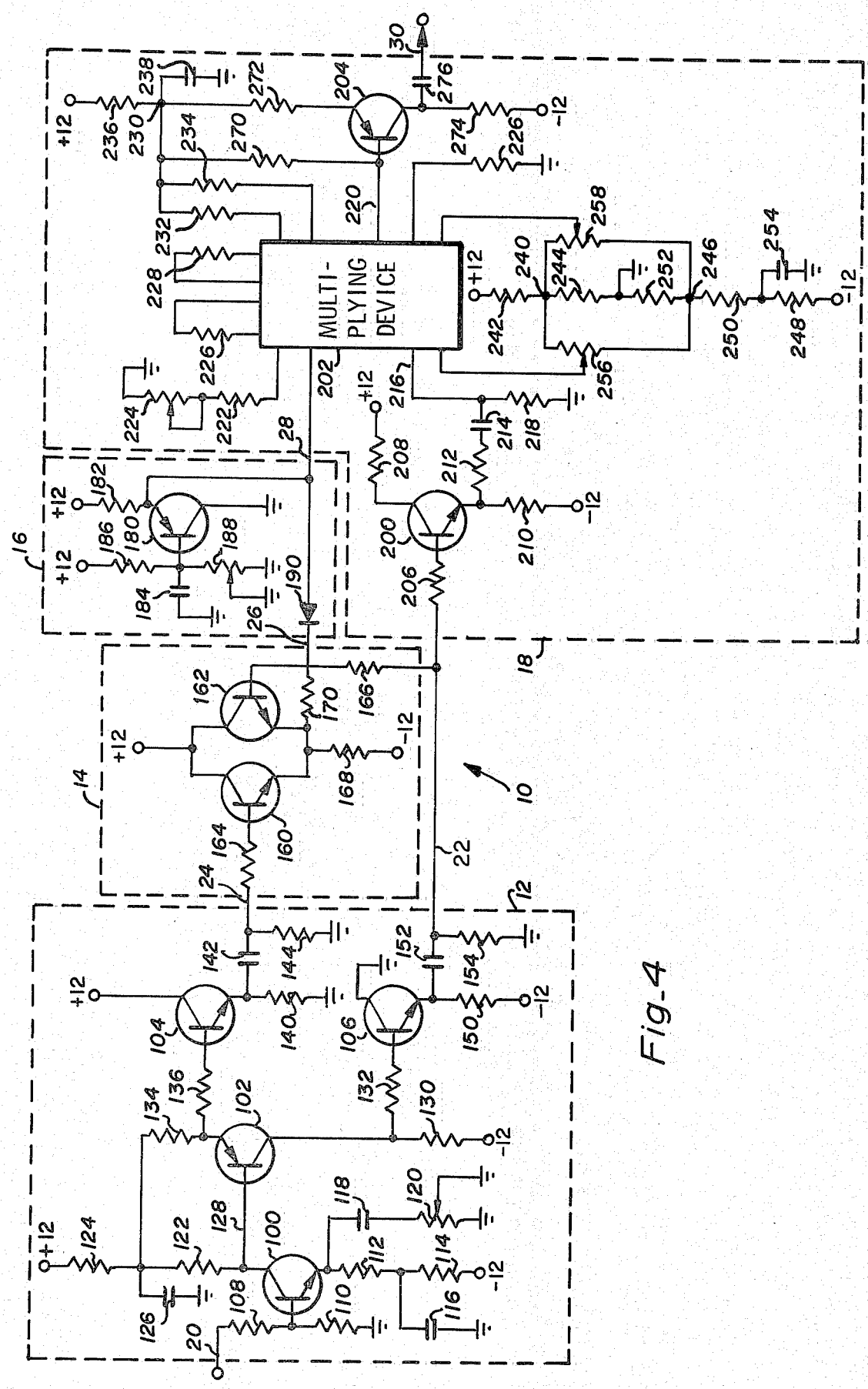
FIG. 4 is a schematic diagram further illustrating the noise suppression apparatus as illustrated in FIG. 1.

Referring now to FIG. 1 of the drawing, the principal components of an improved suppression apparatus 10 is shown to include an input buffer 12, an absolute value circuit 14, a peak clipper 16 and a multiplier 18. Input buffer 12 has an input connected to a line 20 for receiving a video enhancement, or detail, signal and develops a buffered enhancement signal on a line 22 and its complement on line 24.

Absolute value circuit 14 has a first input connected to line 22 and a second input connected to line 24 for receiving the buffered enhancement signal and its complement. The absolute value circuit develops on a line 26 a first signal representing the absolute value of the video enhancement signal.

Peak clipper 16 has an input connected to line 26 for receiving the first signal and develops on a line 28 a clipped signal which is substantially that of the first signal when the first signal is less than a preset level and equal to the preset level when the first signal exceeds that level.

Multiplier 18 has a first input connected to line 28 for receiving the first clipped signal and a second input connected to line 22 for receiving the buffered video enhancement signal. The multiplier generates on an output line 30 a noise reduced video enhancement signal which is substantially the product of the signals developed on lines 22 and 28.

With reference also to FIG. 2, the operation of the preferred embodiment is believed to be as follows. At 40, a portion of the video signal 42 is shown with noise spikes 44 thereon. A video enhancement signal as might be developed from the video signal illustrated at 40 and which would be coupled to the input of the noise suppression apparatus on line 20 is illustrated at 46. The video enhancement signal represents the second derivative of the video signal 42 and that of the noise pulses 44 which appear as doublets, such as the pair of noise pulses illustrated at 50.

The absolute value circuit 14 in response to the video enhancement signal shown at 46, develops a signal on line 26 as illustrated at 52. The resultant signal represents the positive portion of the enhancement signal 54 plus the inverse of the negative portion of the enhancement signal 56.

Peak clipper 16, in response to the signal illustrated at 52, develops a clipped signal 58 on line 28. The clipped signal represents that portion of the signal developed by absolute value circuit 14 which is less than a preset level 60. In response to signal levels exceeding the preset level, peak clipper 16 develops on line 28 a signal having a level substantially that of the preset level.

The output of multiplier 18 on line 30 is illustrated at 62. It will be seen that for positive-going video enhancement signals having a value less than the preset level, the multiplier generates a signal proportional to the square of the enhancement signal 64. It will be noted that because of the low signal level of the noise pulses, the squaring process reduces the relative magnitude of the noise pulses with respect to the video enhancement signal.

It will be noted however that the noise associated with the video enhancement signal will only be reduced during the time that the instantaneous amplitude of the video enhancement signal is within the square law region. Of course, an overall reduction in the noise bandwidth will still result during high level enhancement signals.

For positive-going video enhancement signals having a level in excess of the preset level 60, multiplier 18 generates on line 30 a signal proportional to the product of the magnitude of the enhancement signal times the preset level 60.

The noise suppression apparatus is also effective to reduce the relative noise level of the negative-going portion of the video enhancement signal. In this case, the absolute value circuit 15 inverts the signal in the path of one input to multiplier 18. This is necessary so that the portion of the output signal developed by the multiplier on line 30 is of the correct polarity.

The transfer characteristics of the noise suppression apparatus is illustrated in FIG. 3. It will be seen that in response to signals which have an amplitude less than the preset level 80, but greater than the inverse of the preset level at 82, the noise suppression apparatus develops an output signal proportional to the square of the input signal. Within this pseudoparabolic region, the transfer characteristic 84 may be represented by the equation $Y = (X)(|X|)$.

In response to the portion of a signal which exceeds the preset level, or which is less than the inverse of the preset level, the noise suppression apparatus has a linear transfer characteristic as illustrated by linear regions 86 and 88, which may be represented by the equation $Y = KX$.

Turning now to FIG. 4, a schematic diagram is shown further illustrating the noise suppression apparatus of FIG. 1. The apparatus 10 includes an input buffer 12, an absolute value circuit 14, a peak clipper 16 and a multiplier 18. The active components of input buffer 12 include an NPN transistor 100, a PNP transistor 102 and two NPN transistors 104 and 106. Transistor 100 has a base connected by an oscillation suppression resistor 108 to line 20 for receiving the video enhancement signal and to circuit ground by a biasing resistor 110 and has an emitter which is connected to the negative supply potential by the series connection of an emitter-biasing resistor 112 and a power supply decoupling resistor 114. Resistor 114 is decoupled by a capacitor 116 which is connected between the juncture of resistors 112 and 114 and circuit ground. The emitter of transistor 100 is additionally connected to circuit ground by the series connection of a DC blocking capacitor 118 and a gain adjusting potentiometer 120. The collector of transistor 100 is connected to the positive supply potential by the series connection of a collector resistor 122 and a power supply decoupling resistor 124. Resistor 124 is decoupled by capacitor 126 which is connected from the juncture of resistors 122 and 124 to circuit ground. The collector of transistor 100 is also connected by a line 128 to the base of transistor 102.

Transistor 100 operates as a common emitter amplifier, generating on line 128 an inverted amplified representation of the video enhancement signal developed on line 20. The gain of the amplifier is determined by the setting of potentiometer 120, because the gain reflects the ratio of the resistance of resistor 122 to that of the portion of potentiometer 120 which is in the emitter circuit of the transistor.

Transistor 102 has a collector connected by a collector resistor 130 to the negative power supply potential and by an oscillation suppression resistor 132 to the base of transistor 106. The transistor has an emitter connected by an emitter resistor 134 to the juncture of a resistor 124 and capacitor 126. The emitter of transistor 102 is also connected by an oscillation suppression resistor 136 to the base of transistor 104.

Resistors 130 and 134 are selected to have substantially the same resistance so that transistor 102 will have a unity gain, developing at the base of transistor 104 a signal that is substantially that developed on line 128, and developing a complementary signal at the base of transistor 106.

Transistor 104 has a collector connected to the positive supply potential and an emitter connected to circuit ground by a biasing resistor 140. The emitter of transistor 104 is also connected by a DC blocking capacitor 142 to line 24 which is connected to circuit ground by a biasing resistor 144.

Transistor 104 operates as an emitter follower which in response to an inverted video enhancing signal developed at its base generates a current-amplified, inverted video enhancing signal on line 24.

Transistor 106 has a collector connected to circuit ground and an emitter connected by a biasing resistor 150 to the negative power supply potential. The emitter of transistor 106 is also connected by a DC blocking capacitor 152 to line 22 which is, in turn, connected to circuit ground by a biasing resistor 154.

Transistor 106 operates as an emitter follower which, in response to a video enhancement signal developed at its base, generates a current amplified video enhancement signal on line 22.

Absolute value circuit 14 includes, as active components, NPN transistors 160 and 162. Transistor 160 has a base which is connected by an oscillation suppression resistor 164 to line 24, and transistor 162 has a base which is connected by an oscillation suppression resistor 166 to line 22. The collectors of transistors 160 and 162 are connected to the positive power supply potential, and their emitters are connected by a biasing resistor 168 to the negative power supply potential. The emitters are also connected by an oscillation suppression resistor 170 to line 26.

Transistor 160 and 162 operate as a differential amplifier. However, rather than using the collector outputs as is the usual case, the signal developed at the emitters is used. Specifically, when the amplitude of the buffered video enhancement signal is positive, transistor 162 controls, operating as an emitter follower, to develop a similar signal on line 26. When the amplitude of the buffered video enhancement signal is negative, transistor 160 controls to connect the inverted buffered video enhancement signal developed on line 24 to line 26.

Peak clipper 16 includes a PNP transistor 180 having a grounded collector and an emitter which is connected by a biasing resistor 182 to the positive power supply potential and to line 28. The base of transistor 180 is connected to circuit ground by a capacitor 184 and to the juncture of a biasing resistor 186 and biasing potentiometer 188 which are connected in series between the positive power supply potential and circuit ground. A diode 190 is connected between lines 26 and 28.

Potentiometer 188 is adjusted to develop a potential at the base of transistor 180 that is one diode drop below the desired clipping potential. When signals developed on line 28 would otherwise exceed the clipping potential, transistor 180 conducts, clipping their positive excursions. While transistor 180 is conducting diode 190 is biased off, isolating the absolute value circuit from line 28.

Multiplier 18 includes as active components an NPN transistor 200, a multiplying device 202, and a PNP transistor 204. Transistor 200 has a base which is connected by an oscillation suppression resistor 206 to line 22, a collector which is connected by an oscillation suppression resistor 208 to the positive power supply potential and an emitter which is connected by an emitter-biasing resistor 210 to the negative power supply potential. The emitter of transistor 200 is also connected by the series connection of an oscillation suppression resistor 212 and a DC blocking capacitor 214 to a line 216.

Transistor 200 operates as an emitter follower which in response to a video enhancement signal developed on line 22 generates a current amplified video enhancement signal on line 216.

Multiplying device 202 has a first input connected to line 28, a second input connected to line 216 and to circuit ground by a biasing resistor 218, and an output connected by a line 220 to a base of transistor 204. The multiplying device also has a first current source-setting terminal connected to circuit ground by a series connection of a current source-setting resistor 222 and a current source-adjusting potentiometer 224. The device has a second current source-setting terminal connected to circuit ground by a current source-setting resistor 226. A first pair of gain-setting terminals is interconnected by a first gain-setting resistor 226, a second pair of gain-setting terminals is interconnected by a second gain-setting resistor 228. A common mode-adjusting terminal is connected to a node 230 by a common mode-setting resistor 232, and a complementary output terminal is connected to node 230 by an output load resistor 234. Node 230 is connected to the positive power supply potential by a decoupling resistor 236 and to circuit ground by a coupling capacitor 238.

A positive biasing potential is developed at a node 240 by a voltage divider consisting of a resistor 242 and a resistor 244 connected between the positive power supply potential and circuit ground. A negative biasing potential is developed at a node 246 by the series connection of a decoupling resistor 248, a first voltage divider resistor 250 and a second voltage divider resistor 252 which are connected between the negative power supply potential and circuit ground. A power supply decoupling capacitor 254 is connected from the juncture of resistors 248 and 250 to circuit ground. Two potentiometers 256 and 258 are connected between nodes 240 and 246 to develop at their wipers two biasing potentials which are connected to first and second offset terminals of multiplying device 202. In the preferred embodiment multiplying device 202 is a four-quadrant multiplier such as that designated MC1495 which is manufactured by Motorola, Inc.

In response to the clipped signal developed on line 28 and the video enhancement signal developed on line 216, multiplying device 202 generates on line 220 a signal having an amplitude substantially that of the products of the instantaneous amplitudes of the signals developed on lines 28 and 216.

The base of transistor 204 is also connected to node 230 by a biasing resistor 270, and the emitter of transistor 204 is connected by a first gain-determining resistor 272 to node 230. The collector of transistor 204 is connected by a second gain-determining resistor 274 to the negative power supply potential and by a DC blocking capacitor 276 to line 30. Transistor 204 is operative to amplify the signal developed on line 220 to develop on line 30 a video enhancement signal having an improved signal-to-noise ratio.

Although it is contemplated that after having read the preceding disclosure certain alterations and modifications of the present invention will no doubt become apparent to those skilled in the art, it is intended that the following claims be interpreted to cover all such alterations and modifications as fall within the true spirit and scope of the invention.

What is claimed is:

1. A noise reducing apparatus for improving the signal-to noise ratio of a noisy signal, comprising:
    first means for rectifying the noisy signal to develop a first signal having an instantaneous amplitude substantially equal to the absolute value of the instantaneous amplitude of said noisy signal;
    clipping means for clipping said first signal to generate a second signal having an instantaneous amplitude substantially equal to that of said first signal when said first signal is less than a predetermined value and having an instantaneous amplitude substantially equal to that of said predetermined level when the amplitude of said first signal is greater than said predetermined level; and
    multiplying means responsive to second signal and said noisy signal and operative to generate a noise reduced signal having an instantaneous amplitude proportional to the product of the amplitudes of said second signal and said noisy signal.

2. A noise reducing apparatus as recited in claim 1 wherein, the first means includes inverter means for inverting the noisy signal to develop an inverted noisy signal, a first transistor having a base for receiving said noisy signal, a collector for connection to a first power supply potential and an emitter for connection by a first resistor to a second power supply potential and to said clipping means, said first transistor of the first means being operative to couple positive excursion of said noisy signal to said clipping means, and a second transistor having a base for receiving said inverted noisy signal, a collector for connection to said first power supply potential, and an emitter connected to said emitter of said first transistor of the first means, said second transistor being operative to couple positive excursion of said inverted noisy signal to said clipping means.

3. A noise reducing apparatus as recited in claim 1 wherein, the clipping means includes a transistor having a collector for connection to a ground potential, a base for connection to a biasing potential which is one emitter-base junction potential drop below said preset level and an emitter, a diode for coupling said first signal to said emitter of said transistor of the clipping means, and a resistor for connecting said emitter of said transistor of the clipping means to a first power supply potential, whereby said transistor of the clipping means is normally in an off state causing said resistor of the clipping means to forward bias said diode of the clipping means, said transistor of the clipping means being responsive to said first signal exceeding a potential one diode potential drop below said preset level and operative to switch to an active state wherein said transistor of the clipping means reverse biases said diode of the clipping means and prevents the potential at said emitter of the transistor of the clipping means from exceeding said preset level thereby developing said second signal for input to said multiplying means.

4. A noise reducing apparatus as recited in claim 3 wherein, the first means includes inverter means for inverting the noisy signal to develop an inverted noisy signal, a first transistor having a base for receiving said noisy signal, a collector for connection to a first power supply potential and an emitter for connection to a second power supply potential and to said diode of the clipping means, said first transistor of the first means being operative to couple positive excursion of said noisy signal to said diode of the clipping means, and a second transistor having a base for receiving said inverted noisy signal, a collector for connection to said first power supply potential, and an emitter connected to said emitter of said first transistor of the first means, said second transistor being operative to couple positive excursion of said inverted noisy signal to said diode.

5. In a video enhancement apparatus for increasing the apparent bandwidth of a video signal including a differentiation circuit for taking the second derivative of the video signal, a noise reducing circuit for reducing noise associated with the differentiated signal, and a combining circuit for combining the noise reduced signal with the video signal, an improved noise reducing circuit comprising:

first means for rectifying the differentiated signal to develop a first signal having an instantaneous amplitude substantially equal to the absolute value of the instantaneous amplitude of said differentiated signal;

clipping means for clipping said first signal to generate a second signal having an instantaneous amplitude substantially equal to that of said first signal when said first signal is less than a predetermined value and having an instantaneous amplitude substantially equal to that of said predetermined level when the amplitude of said first signal is greater than said predetermined level; and multiplying means responsive to said second signal and said differentiated signal and operative to generate the noise reduced signal having an instantaneous amplitude proportional to the product of the amplitudes of said second signal and said differentiated signal.

6. In a video enhancement apparatus as recited in claim 5 wherein, the first means includes inverter means for inverting the differentiated signal to develop an inverted differentiated signal, a first transistor having a base for receiving said differentiated signal, a collector for connection to a first power supply potential and an emitter connected to said clipping means, said first transistor of the first means being operative to couple positive excursion of said differentiated signal to said clipping means, and a second transistor having a base for receiving said inverted differentiated signal, a collector for connection to said first power supply potential, and an emitter connected to said emitter of said first transistor of the first means, said second transistor being operative to couple positive excursion of said inverted differentiated signal to said clipping means.

7. In a video enhancement apparatus as recited in claim 5 wherein, the clipping means includes a transistor having a collector for connection to a ground potential, a base for connection to a biasing potential which is one emitter-base junction potential drop below said preset level and an emitter, a diode for coupling said first signal to said emitter of said transistor of the clipping means, a resistor for connecting said emitter of said transistor of the clipping means to a first power supply potential, whereby said transistor of the clipping means is normally in an off state causing said resistor of the clipping means to forward bias said diode of the clipping means, said transistor of the clipping means being reponsive to said first signal exceeding a potential one diode potential drop below said preset level and operative to switch to an active state wherein said transistor of the clipping means reverse biases said diode of the clipping means and prevents the potential at said emitter of the transistor of the clipping means from exceeding said preset level thereby developing said second signal for input to said multiplying means.

8. In a video enhancement apparatus as recited in claim 7 wherein, the first means includes inverter means for inverting the differentiated signal to develop an inverted differentiated signal, a first transistor having a base for receiving said differentiated signal, a collector for connection to a first power supply potential and an emitter for connection to a second power supply potential and to said diode of the clipping means, said first transistor being operative to couple positive excursion of said differentiated signal to said diode; and a second transistor having a base for receiving said inverted differentiated signal, a collector for connection to said first power supply potential, and a second emitter connected to said emitter of said first transistor of the first means, said second transistor being operative to couple positive excursion of said inverted differentiated signal to said diode.

9. In a video enhancement apparatus as recited in claim 8 wherein, the inverter means includes a first resistor, a second resistor having an impedance substantially the same as that of said first resistor, first connecting means, second connecting means, and a third transistor having a base for receiving said differentiated signal, an emitter for connection by said first resistor to said first power supply potential and connected by said first connecting means to said base of said first transistor of the inverter means, a collector for connection by said second resistor to said second power supply potential and connected by said second connecting means to said base of said second transistor of the inverter means, said third transistor for connecting said differentiated signal to said base of said first transistor of the inverter means and for developing said inverted differentiated signal at said base of said second transistor of the inverter means.

* * * * *